(12) United States Patent
Iannone et al.

(10) Patent No.: US 10,704,463 B2
(45) Date of Patent: Jul. 7, 2020

(54) METHOD OF MONITORING AN ENGINE ABLE TO OPERATE WITH SELECTIVE VALVE DEACTIVATION

(71) Applicant: DELPHI TECHNOLOGIES IP LIMITED, St. Michael (BB)

(72) Inventors: Charles A. Iannone, West Henrietta, NY (US); Adam M. Agosti, Rochester, NY (US)

(73) Assignee: DELPHI TECHNOLOGIES IP LIMITED (BB)

( * ) Notice: Subject to any disclaimer, the term of this patent is extended or adjusted under 35 U.S.C. 154(b) by 208 days.

(21) Appl. No.: 15/911,795

(22) Filed: Mar. 5, 2018

(65) Prior Publication Data

US 2019/0271265 A1    Sep. 5, 2019

(51) Int. Cl.
| F02B 77/08 | (2006.01) |
| F02B 31/02 | (2006.01) |
| F02D 41/00 | (2006.01) |
| F02D 41/22 | (2006.01) |
| F02D 13/02 | (2006.01) |
| F02B 31/00 | (2006.01) |

(52) U.S. Cl.
CPC ............ *F02B 77/082* (2013.01); *F02B 31/02* (2013.01); *F02D 13/0226* (2013.01); *F02D 13/0257* (2013.01); *F02D 41/008* (2013.01); *F02D 41/0087* (2013.01); *F02D 41/22* (2013.01); *F02D 41/221* (2013.01); *F02B 2031/006* (2013.01); *F02D 2041/001* (2013.01); *F02D 2041/0015* (2013.01); *F02D 2200/0406* (2013.01)

(58) Field of Classification Search
CPC .. F02B 77/082; F02B 31/02; F02B 2031/006; F02D 41/221; F02D 41/008; F02D 13/0226; F02D 13/0257; F02D 41/22; F02D 41/0087; F02D 2041/0015; F02D 2041/001; F02D 2200/0406
See application file for complete search history.

(56) References Cited

U.S. PATENT DOCUMENTS

| 5,033,290 | A | 7/1991 | Seki et al. |
| 6,213,068 | B1 | 4/2001 | Hassdenteufel |
| 6,553,961 | B2 * | 4/2003 | Hammoud ................ F01L 9/02 123/308 |
| 7,634,940 | B2 * | 12/2009 | Hartmann ............. F02D 41/221 73/114.37 |
| 8,286,471 | B2 | 10/2012 | Doering et al. |
| 9,562,470 | B2 * | 2/2017 | Younkins .............. F02B 77/082 |

(Continued)

*Primary Examiner* — Freddie Kirkland, III
(74) *Attorney, Agent, or Firm* — Joshua M. Haines

(57) ABSTRACT

A method is provided for monitoring the operation of intake valves of an internal combustion engine, where at least one or more cylinders of the engine have more than one intake valve, and adapted to operate in different modes where at least one of the intake valves for a particular cylinder can be selectively activated, or deactivated so as not to open during a firing sequence for the cylinder. The method includes a) monitoring the intake manifold air pressure; b) during a time window with respect to the intake phase for said respective cylinder, determining the condition of whether the manifold pressure drops by a threshold or to a particular threshold level; and c) determining the functionality of the intake valves dependent on the outcome of step b).

4 Claims, 1 Drawing Sheet

(56) References Cited

U.S. PATENT DOCUMENTS

| | | | |
|---|---|---|---|
| 9,784,644 B2 * | 10/2017 | Chen | F02D 35/024 |
| 9,835,522 B2 * | 12/2017 | Chen | F02M 35/1038 |
| 9,890,732 B2 * | 2/2018 | Younkins | F02D 41/221 |
| 9,891,137 B2 * | 2/2018 | Chen | F02M 35/1038 |
| 9,995,652 B1 * | 6/2018 | Chen | F02D 41/0087 |
| 2002/0066434 A1 | 6/2002 | Hammoud et al. | |
| 2008/0236267 A1 | 10/2008 | Hartmann et al. | |

* cited by examiner

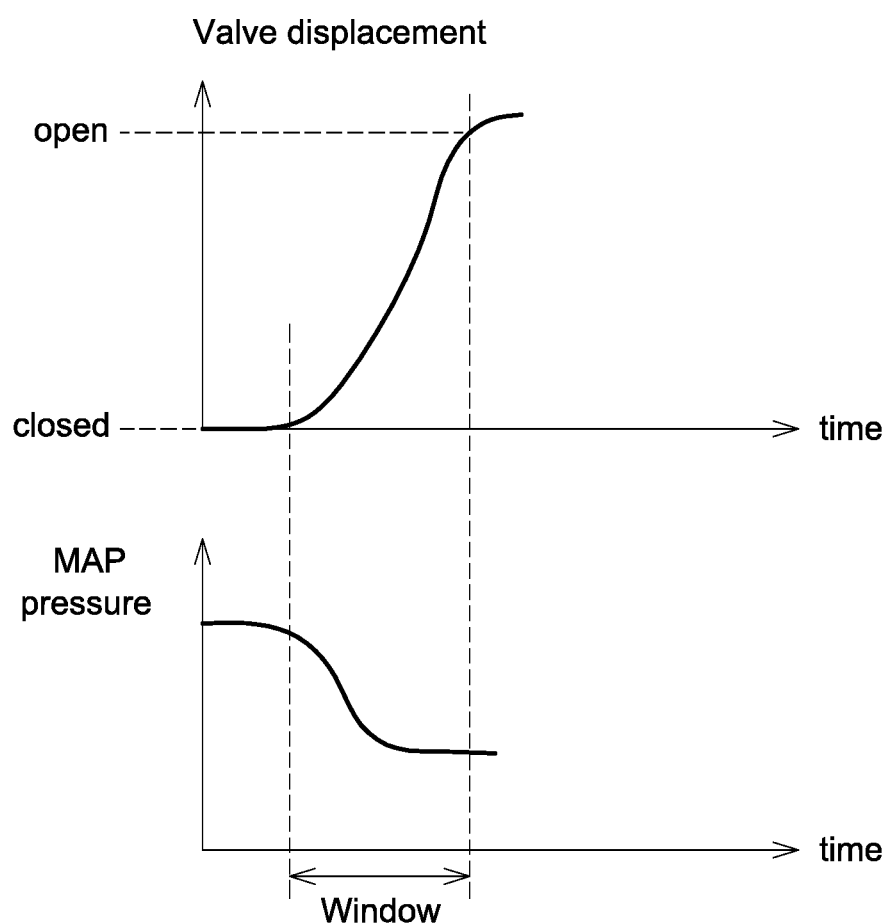

METHOD OF MONITORING AN ENGINE ABLE TO OPERATE WITH SELECTIVE VALVE DEACTIVATION

TECHNICAL FIELD

This invention relates to a method of monitoring the operation of internal combustion engines, where at least one or more cylinders have more than one intake valve. It has particular application to monitoring engine systems where one or more intake valves can be selectively deactivated so as not to open during a firing sequence, when these valves would normally open. The invention has particular but not exclusive application to monitoring skip fire operation of engines.

BACKGROUND OF THE INVENTION

Skip fire methodology involves selective cylinder deactivation to increase engine operating efficiency by disabling engine valves to reduce pumping losses when fewer cylinders are required for a particular operating point.

In similar methodology, a method of operating multi intake valve engines (multi-cylinder skip fire internal combustion engine systems), that is to say where each cylinder has more than one intake valve, involves deactivating only one intake valve for each multi intake valve cylinders in order to produce a swirl motion for the incoming charge air. This "swirl" mode of operation can replace "swirl valve" actuators used in some commercially available engines today, if the engines were to have valve deactivation hardware instead.

It is an object of the invention to provide a method of diagnosing such operation.

Prior art U.S. Pat. No. 9,562,470B2 patent by Tula Technology Inc. presents some methods for detecting valve actuation faults in a multi-cylinder skip fire internal combustion engine specifically to the end goal of detecting faults during skip fire operation.

SUMMARY OF THE INVENTION

In one aspect is provided a method of monitoring the operation of intake valves of an internal combustion engine, where at least one or more cylinders of said engine have more than one intake valve, and adapted to operate in different modes where at least one of said intake valves for a particular cylinder can be selectively activated, or deactivated so as not to open during a firing sequence for the cylinder comprising, a) monitoring the intake manifold air pressure;
b) during a time window with respect to the intake phase for said respective cylinder, determining the condition of whether the manifold pressure drops by a threshold or to a particular threshold level; and
c) determining the functionality of the intake valves dependent on the outcome of step b).

Said method may be implemented during a mode when at least one intake valve is controlled to be activated for said cylinder and at least one intake valve is controlled to be deactivated during respective intake phase for that cylinder and where if the condition of step b) is fulfilled, step c) comprises determining that the engine is operating correctly and/or if the condition of step b) is not fulfilled, step c) comprises indicating a fault.

If a fault is indicated it may be concluded said fault is with the intake valve controlled to be de-activated.

Said method may be implemented in a mode where all intake valves are controlled to be deactivated during respective intake phase for that cylinder and where: if the condition of step b) is not fulfilled, step c) comprises determining that the engine is operating correctly and/or if the step b) is not fulfilled, indicating a fault.

Said method may be implemented in a mode where i) a normally active intake valve for said cylinder is operated to be activated and a normally deactivated intake valve for said cylinder is operated to be deactivated, or, where ii) a normally deactivated intake valve is commanded to be activated and a normally activated valve commanded to deactivate.

Said method may be implemented in a mode where all intake valves for said cylinder are operated to be activated.

The method may include a further step of determining if the throttle position of the engine is below a threshold, and if so validating the result.

The manifold air pressure may be determined using the engine's MAP sensor.

One or more cylinders of said engine each may have two intake valves.

BRIEF DESCRIPTION OF THE DRAWINGS

The present invention is now described by way of example with reference to the accompanying drawings in which:

FIG. 1 shows a plots of the MAP pressure against time (top plot) and the valve actuation, e.g. displacement against time, (bottom plot).

DETAILED DESCRIPTION OF THE PREFERRED EMBODIMENTS

To recap, a known method of operating multi intake valve engines involves selectively deactivating one or more intake valve for each multi intake valve cylinders in order to produce a swirl motion for the incoming charge air. Typically for engines with two intake valves per cylinder, one valve will be deactivated. When this cylinder deactivation methodology is applied to an engine that employs multiple intake valves, the method of selectively deactivating one or more intake valves of a cylinder may be implemented by modifying multi-cylinder valve deactivation systems to e.g. enable an additional "swirl mode" of operation where one intake valve is disabled, while the other valve(s) are enabled to induce a swirl motion to the intake charge air, to improve combustion, and reduce unwanted emissions components. Thus in a swirl mode, there is at least one deactivated valve and one activated valve.

Multi (all) valve deactivation hardware/software is designed primarily to enable cylinder deactivation by deactivating all valves to increase engine operating efficiency by disabling engine valves to reduce pumping losses when fewer cylinders are required for a particular operating point, such as in skip-fire systems.

As mentioned in one mode of operation, one intake valve per cylinder would be designed to be normally deactivated while the others are normally activated; meaning this is the default state for the engine to have one intake valve off, and the other on and it would take a command signal to open all intake valves, or deactivate all intake valves for the other desired modes of operation used for skip fire.

For engine systems with two intake valves per cylinder, when one valve is normally deactivated (closed), and the other normally activated (open), methodology according to the invention allows detection of whether the system is working correctly e.g. whether the "swirl" mode of operation is working or not, which is required when "swirl mode" is employed to improve engine emissions performance. And it is possible to default to the desired mode of operation which is to have "swirl mode" active for most operating conditions. (Swirl is usually only turned off for high load or high flow modes of operation.) In addition to high load or high flow modes of operation, swirl mode may be also turned off for full cylinder deactivation (intake valve(s) and exhaust valve(s) are turned off).

The phrase "during a time window with respect to the intake phase for a particular cylinder" in the claims means during a period of time where for a particular cylinder, the intake valves (or at least one) would usually be opened under normal operation to allow fuel air mixture to enter the chamber for subsequent compression and combustion. It however also includes a time window where during e.g. skip fire operation, none of the valves are opened during "intake" so as to deactivate operation of the cylinder.

The skilled person would readily determine a suitable time window which may be a variable period which spans the time from when one or more valves of that cylinder would start to open or would normally start to open under normal non skip fire operation.

The invention comprises taking measurements of the intake Manifold Air Pressure (MAP) and analyzing the signal, and determining if the signal agrees with an expected level or change depending on the control state of the intake valves (e.g. per cylinder). So for example this is achieved by, analyzing the MAP sensor signal/output (e.g. via multiple synchronized measurements of the intake manifold pressure).

The method may be performed by using the output from existing MAP sensors. Multiple synchronized measurements of the existing intake manifold pressure (MAP) sensor of most common gasoline internal combustion engines are performed under different operating conditions where one or more valves may be deactivated or activated (e.g. less than wide open throttle) to detect when either or both of the engine intake valves of a particular cylinder are activated or both intake valves are deactivated.

In general, in an engine system with two intake valves for each cylinder, with respect of a particular cylinder, during the time of intake for that cylinder i.e. during a time window when the respective valve(s) opens or starts to open, the MAP (pressure signal) goes low (i.e. during the intake stroke) i.e. when the valve is acting normally i.e. activated. The pressure signal does not go low when both intake valves are deactivated during the time for intake on that cylinder (i.e. when both or all valves do not open). These responses can be detected by sampling the common MAP sensor with an e.g. low pass filter that preferably has a relatively high cutoff. In addition when e.g. (at least) one of the intake valves is deactivated and (at least) one intake valve is activated; the pressure signal should go low.

The following provides details of the methodology according to examples of the invention for different operating conditions.

Example A. In a Mode where there is at Least One Valve Deactivated so as not to Open and at Least Another Valve is Activated to Open. e.g. "Swirl Mode"

This is where a normally active valve is activated and a particular valve is de-active (does not open) (swirl mode).

If the MAP signal for the appropriate cylinder goes low, this results in a "pass" and an indication of proper working.

FIG. 1 shows plots of the MAP pressure against time (top plot) and the valve actuation, e.g. displacement against time, (bottom plot). As can be seen where at least one valve opens there is a consequential drop in MAP pressure, during the intake window for a particular cylinder.

If MAP signals do not go low, then this is a "fail" indication. This indicates there is a fault in the normally active valve i.e. failure to activate.

Corrective action can be taken to activate the normally deactivated valve and reduce torque to reasonable levels in this condition to keep the engine running while indicating a faulted condition.

In a preferred embodiment, a condition for this check is that the throttle position is reasonably low (e.g. below a threshold) or closed enough to choke some engine flow.

Example B. All Valves Deactivated

This covers the case where all intake valves are operated to be deactivated (not open). E.g. a normally active intake valve is commanded to deactivate and a "deactivated" (in swirl mode) intake valve is commanded to de-activate (not open) also (i.e. default for the deactivated intake valve plus active valve commanded to deactivate).

If synchronized MAP signals go low when in this case (where both (or all) intake valves should be deactivated (closed)) then a fault is indicated.

Here, it may be assumed that a normally deactivated valve (e.g. in swirl mode) has a failure to deactivate or is just stuck in an activated state (providing no swirl motion).

If the MAP signals do not go low then the cylinder has been deactivated properly, and the normally deactivated valve may be assumed to be working OK and appropriately be able to provide swirl motion in subsequent operation, particularly if tests in the next section are implemented.

Again, in a preferred embodiment a condition for this check is that the throttle position is reasonably low (e.g. below a threshold) or closed enough to choke some engine flow.

Example C. Normally Deactivated Valve Commanded to Activate AND Normally Activated Valve Commanded to Deactivate (Reverse Swirl)

This is similar to A above where at least one valve activated and one valve de-activated.

This is the operating condition where) a normally deactivated valve is commanded to activate and a normally activated valve commanded to deactivate (reverse swirl).

If the MAP signal for the appropriate cylinder goes low, this results in a "pass" and an indication of proper working e.g. of the normally deactivated valve that provides swirl motion, particularly if the test above in B results in a pass.

This test may be performed preferably after (or before) the test B above where this previous test indicates a "pass." This results in diagnosing correct operation of the normally activated valve and/or deactivated valve that provides swirl motion respectively.

If MAP signals do not go low, then this is a "fail" indication. E.g. a fault to the normally deactivated valve (failure to activate). Action can be taken to limit engine torque in this condition to keep the engine running with low emissions, as high flow operation is compromised.

Again, in a preferred embodiment a condition for this check is that the throttle position is reasonably low (e.g. below a threshold) or closed enough to choke some engine flow.

Example D. No Deactivation of any Intake Valve.
(i.e. all Valves to Controlled to be Active/Opened)

This covers the case where there are no intake valve deactivation commands. In other words, all valves are commanded to open. This is the default state without skip-fire or swirl mode. This includes the case where there is no deactivation of the normally activated valves, and no deactivation of the normally (in swirl mode) deactivated valves i.e. Normally Deactivated valve (in swirl mode) are commanded to activate.

If the (e.g. synchronized) MAP signal goes low during the intake window for a particular cylinder, then the method determines this is a "pass" condition (e.g. for the defaulted non-commanded state) and there are no faults.

If MAP signals do not go low, then this is an indication of a fault in the systems e.g. fault with one or more of the normally activated valve(s) (failure to activate) or its operation.

In a preferred embodiment, a condition for this check is that the throttle position is reasonably low (e.g. below a threshold) or closed enough to choke some engine flow.

So in a preferred embodiment if (synchronized) MAP readings/signal do not go low when all intake valves should be open and throttle position is reasonably low or closed enough to choke some engine flow, then there are either multiple valve activation/deactivation system faults or a problem with the MAP sensor readings that needs further diagnosis.

General

The term "goes low" with regard to the MAP signal means falling by a minimum threshold value or falling to a minimum threshold value. For purposes of this description, "synchronized MAP readings" are at a minimum a comparison of two MAP readings where one is taken at a synchronized crank angle earlier during the intake stroke than the other. Alternatively, the signal may be continually monitored. The MAP readings go down when the later MAP reading is lower than the earlier MAP reading for a particular cylinder intake stroke. (These readings should be categorized for the respective cylinder).

Where there are two intake valves, the control of the valves is such that in case A covers the case where valve 1 (active valve in a swirl mode) is operated to be open and valve 2 (de-active valve in a swirl mode) is operated to be shut. Case B covers the case where valves 1 and 2 are operated to be closed, case C where valves 1 and 2 are operated to be shut and open respectively and case D where valves 1 and 2 are operated to be open.

It should be understood that two or more or any combination of the above tests may be carried out. Advantageously two or more different tests may in circumstances yield more specifics of the fault. For example, if test B is carried out, and is passed, then C is passed then the respective valve which opens in these cases is operating normally. If test A or C are passed and test B is failed, then this indicates the valve at fault is the deactive valve failing to shut or the active valve failing to shut respectively.

We claim:

1. A method of monitoring the operation of intake valves of an internal combustion engine, where at least one or more cylinders of said engine have more than one intake valve, and adapted to operate in different modes where at least one of said intake valves for a particular cylinder can be selectively activated, or de-activated so as not to open during a firing sequence for the particular cylinder comprising:
    a) monitoring intake manifold air pressure;
    b) during a time window with respect to an intake phase for said particular cylinder, determining a condition of whether the intake manifold air pressure drops by a threshold or to a particular threshold level; and
    c) determining functionality of the intake valves dependent on the outcome of step b);
    where said method is implemented during a mode when at least one intake valve is controlled to be activated for said particular cylinder and at least one intake valve is controlled to be deactivated during respective intake phase for that cylinder; and
    where if the condition of step b) is fulfilled, step c) comprises determining that the engine is operating correctly and/or if the condition of step b) is not fulfilled, step c) comprises indicating a fault.

2. A method as claimed in claim 1 where if a fault is indicated it is concluded said fault is with the intake valve controlled to be deactivated.

3. A method as claimed in claim 1 said method is implemented in a mode where i) a normally active intake valve for said cylinder is operated to be activated and a normally deactivated intake valve for said cylinder is operated to be deactivated, or, where ii) a normally deactivated intake valve is commanded to be activated and a normally activated valve commanded to deactivate.

4. A method as claimed in claim 1 said method is implemented in a mode where all intake valves for said cylinder are operated to be activated.

* * * * *